(12) United States Patent
Kamiya et al.

(10) Patent No.: US 11,009,129 B2
(45) Date of Patent: May 18, 2021

(54) VEHICLE PARKING APPARATUS

(71) Applicant: Honda Motor Co., Ltd., Tokyo (JP)

(72) Inventors: Shinji Kamiya, Wako (JP); Makoto Tsuchihashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/819,003

(22) Filed: Mar. 13, 2020

(65) Prior Publication Data
US 2020/0300359 A1 Sep. 24, 2020

(30) Foreign Application Priority Data
Mar. 20, 2019 (JP) .............................. JP2019-052100

(51) Int. Cl.
*F16H 63/34* (2006.01)
*B60T 1/00* (2006.01)

(52) U.S. Cl.
CPC .......... *F16H 63/3416* (2013.01); *B60T 1/005* (2013.01)

(58) Field of Classification Search
CPC ............. F16H 63/3416; F16H 63/3466; F16H 63/3433; F16H 63/3425; B60T 1/005; B60T 1/062; B60Y 2300/18141; B60K 2001/001; F16D 63/006
See application file for complete search history.

(56) References Cited

U.S. PATENT DOCUMENTS

| 3,912,050 | A | | 10/1975 | Iwanaga et al. | |
|---|---|---|---|---|---|
| 6,164,427 | A | * | 12/2000 | Ogawa | B60T 1/005 192/219.5 |
| 2013/0284559 | A1 | * | 10/2013 | Barton | F16H 63/3425 192/219.5 |
| 2014/0231213 | A1 | * | 8/2014 | Isomura | F16D 63/006 192/219.5 |

FOREIGN PATENT DOCUMENTS

| JP | S49128422 A | 12/1974 |
|---|---|---|
| JP | 2002054454 A | 2/2002 |
| JP | 2003276580 A | 10/2003 |
| JP | 2004068822 A | 3/2004 |
| JP | 2014080110 A | 5/2014 |

\* cited by examiner

*Primary Examiner* — David R Morris
*Assistant Examiner* — Lori Wu
(74) *Attorney, Agent, or Firm* — Duft & Bornsen, PC

(57) ABSTRACT

A vehicle parking apparatus displaced across first and second cases joined together through joined surfaces. The vehicle parking apparatus includes a rotation member supported rotatably at the first case to rotate in accordance with parking activation command and parking release command, a parking rod extended from the first case to the second case and including a base portion supported rotatably at the rotation member to move to first direction and second direction by rotation of the rotation member, a parking pole supported swingably at the second case and brought into contact with a top portion of the parking rod to engage with and disengage from a parking gear in accordance with movement of the parking rod in the first direction and the (Continued)

second direction, and a plate shaped stay fixed to the first case and including a notch into which the parking rod is inserted.

9 Claims, 10 Drawing Sheets

VEHICLE PARKING APPARATUS

CROSS-REFERENCE TO RELATED APPLICATION

This application is based upon and claims the benefit of priority from Japanese Patent Application No. 2019-052100 filed on Mar. 20, 2019, the content of which is incorporated herein by reference.

BACKGROUND OF THE INVENTION

Field of the Invention

This invention relates to a vehicle parking apparatus disposed across a pair of cases.

Description of the Related Art

Conventionally, as this type of apparatus, there is a known apparatus that includes a plate rotating in accordance with a shift operation, and a parking rod disposed across a pair of cases so that an end portion of the parking rod is turnably supported at the plate. Such an apparatus is described, for example, in Japanese Unexamined Patent Publication No. 2003-276580 (JP2003-276580A). The apparatus of JP2003-276580A includes an approximately cylindrical rod guide through which the top end of the parking rod is passed, so as to restrict the position of the parking rod.

However, in the case of an apparatus where a parking rod is passed through a cylindrical rod guide, such as JP2003-276580A, there is a large limit to the length or the like of the parking rod, resulting in a loss of design flexibility.

SUMMARY OF THE INVENTION

An aspect of the present invention is a vehicle parking apparatus, displaced across a first case and a second case joined together through a joined surface of the first case and a joined surface of the second case. The vehicle parking apparatus includes: a rotation member supported rotatably at the first case to rotate in accordance with a parking activation command and a parking release command; a parking rod extended from the first case to the second case and including a base portion supported rotatably at the rotation member to move to a first direction and a second direction opposite to the first direction by a rotation of the rotation member; a parking pole supported swingably at the second case and brought into contact with a top portion of the parking rod to engage with and disengage from a parking gear in accordance with a movement of the parking rod in the first direction and the second direction; and a stay formed in a plate shape, fixed to the first case and including a notch into which the parking rod is inserted.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
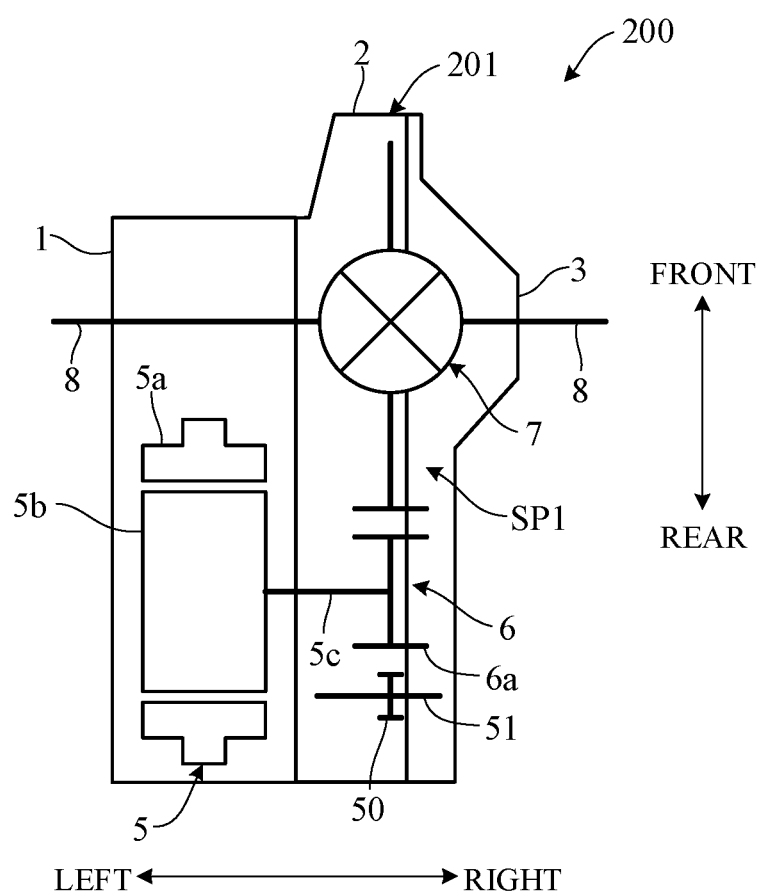
FIG. 1 is a diagram showing schematically a configuration of a vehicle drive apparatus including a vehicle parking apparatus according to an embodiment of the invention.

Hereinafter, an embodiment of the present invention is explained with reference to FIGS. 1 to 9B. A vehicle parking apparatus according to the present embodiment is incorporated in a vehicle drive apparatus for driving the vehicle to travel. FIG. 1 is a drawing showing a schematic configuration of a vehicle drive apparatus according to the present embodiment. The front-rear direction and the left-right direction are defined as shown in the drawings, and the configuration of the components will be described in accordance with this definition. The front-rear direction corresponds to the length direction of the vehicle, and the left-right direction corresponds to the width direction of the vehicle. A direction perpendicular to the front-rear direction and left-right direction, that is, the up-down direction (FIG. 3) corresponds to the height direction of the vehicle.

As shown in FIG. 1, an entire vehicle drive apparatus 200 is surrounded by a case 201. The case 201 includes a motor cover 1 disposed on the left side, a gear case 2 disposed on the right side of the motor cover 1, and a gear cover 3 disposed on the right side of the gear case 2. The vehicle drive apparatus 200 includes an electric motor 5, a transmission 6, and a differential mechanism 7 in the case 201. The electric motor 5 includes an approximately cylindrical stator 5a disposed around an axis extending in the left-right direction and a rotor 5b that rotates around the axis extending in the left-right direction inside the stator 5a. Rotation outputted from a rotary shaft 5c of the rotor 5b is speed-changed by the transmission 6 including a gear 6a and inputted to the differential mechanism 7. The rotation inputted to the differential mechanism 7 is distributed to a pair of left and right drive shafts 8, resulting in travel of the vehicle.

The vehicle drive apparatus 200 also includes a rotary shaft 51 that extends in the left-right direction and on which a parking gear 50 is integrally disposed. Although not shown, the rotary shaft 51 is also integrally provided with a gear engaged with the gear of a rotary shaft (e.g., the rotary shaft 5c) that rotates during rotation of a drive shaft 8. The parking gear 50 rotates in conjunction with the drive shaft 8. Accordingly, stopping rotation of the parking gear 50 (parking lock) allows for stopping rotation of the drive shaft 8. Rather than on the rotary shaft 51, the parking gear 50 may be integrally disposed on, for example, the rotary shaft 5c of the rotor 5b. That is, the parking gear 50 may be disposed on any rotary shaft that rotates in conjunction with the drive shaft 8.

Figure 2:
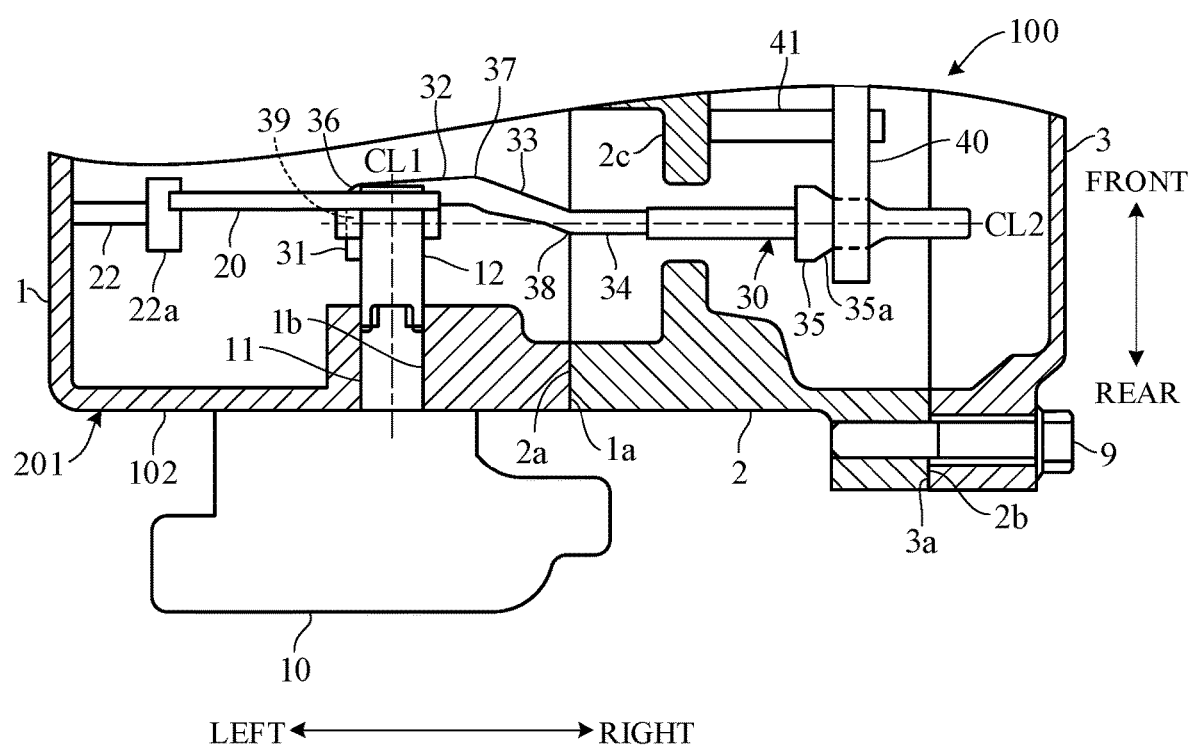
FIG. 2 is a section view showing a configuration of the main components of the vehicle drive apparatus of FIG. 1.

FIG. 2 is a sectional view showing the configuration of the main components of the vehicle drive apparatus 200 and, in particular, a schematic configuration of a vehicle parking apparatus 100. As shown in FIG. 2, the right end surface 1a of the motor cover 1 and the left end surface 2a of the gear case 2 are in contact with each other and are integrally joined together using circumferentially disposed multiple bolts (not shown). The right end surface 2b of the gear case 2 and the left end surface 3a of the gear cover 3 are in contact with each other and are integrally joined together using circumferentially disposed multiple bolts 9. The right end surface 1a of the motor cover 1, the left end surface 2a and right end surface 2b of the gear case 2, and the left end surface 3a of the gear cover 3 are referred to as the joined surfaces. The joined surfaces 1a, 2a, 2b, and 3a extend on planes extending in the front-rear direction and up-down direction. To improve the sealability of the joined surfaces 1a, 2a, 2b, and 3a, a liquid sealant is applied thereto during assembly.

Figure 3:
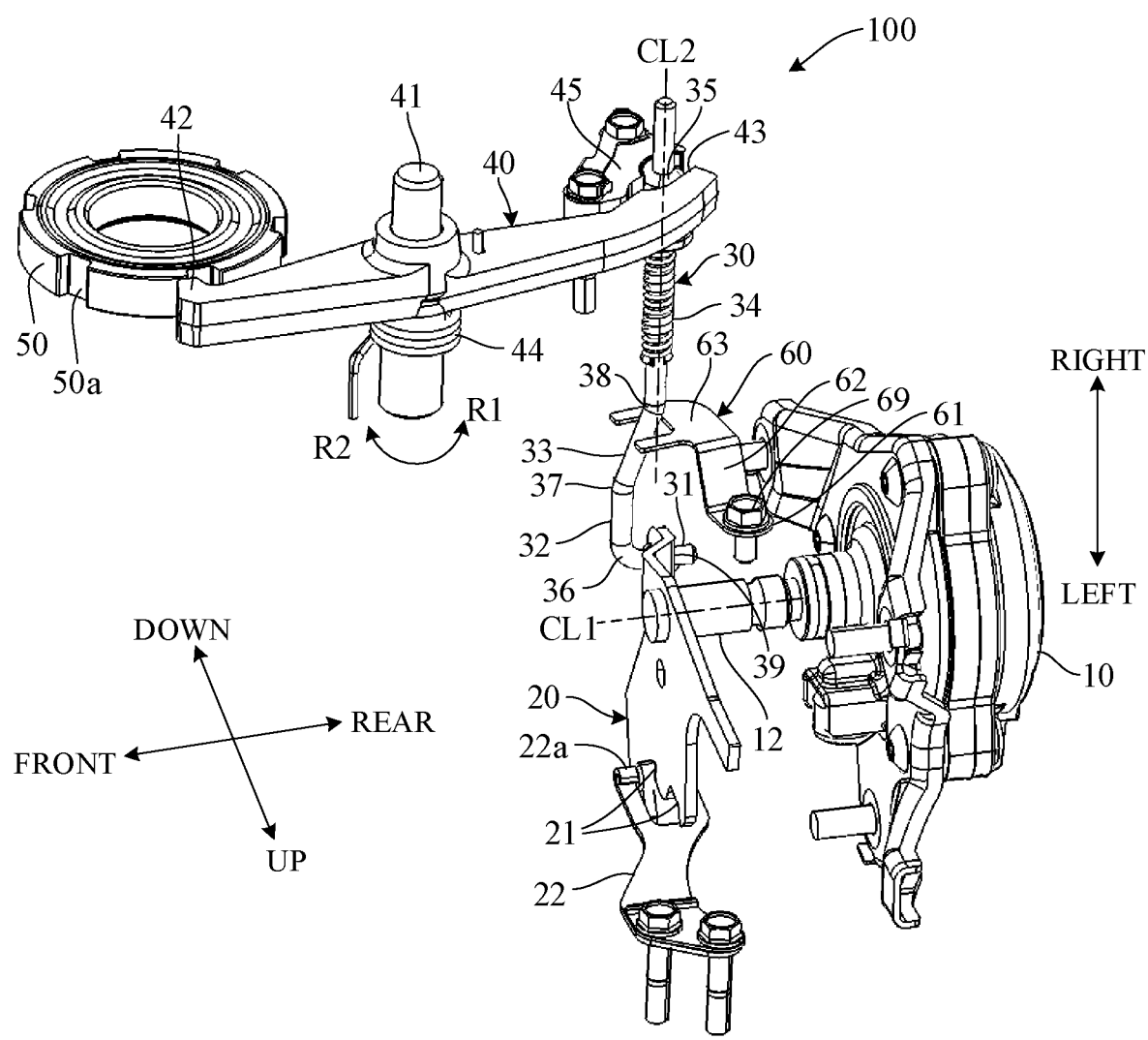
FIG. 3 is a perspective view showing an overall configuration of the vehicle parking apparatus according to the embodiment of the invention.

FIG. 3 is a perspective view showing the overall configuration of the vehicle parking apparatus 100 according to the embodiment of the present invention. As shown in FIGS. 2 and 3, the vehicle parking apparatus 100 includes an actuator 10, such as an electric motor, a detent plate 20 that is rotationally driven by the actuator 10, a parking rod 30 that moves (advances and retreats) in the left-right direction in association with rotation of the detent plate 20, a parking pawl 40 that swings in accordance with advance and retreat of the parking rod 30, and the parking gear 50 whose rotation is stopped when the parking gear 50 is engaged with the parking pawl 40.

As shown in FIG. 2, the actuator 10 is mounted on the rear wall 102 of a case (the motor cover 1 or the like). The rear wall 102 of the motor cover 1 is provided with a through hole 1b that extends along the axis CL1 in the front-rear direction and through which the rotary shaft 11 of the actuator 10 is passed. A rotary shaft 12 coaxial with the rotary shaft 11 is integrally coupled to the rotary shaft 11 by spline coupling so as to be rotatable integrally with the rotary shaft 11. The detent plate 20 is fixed to the front end of the rotary shaft 12. Thus, the detent plate 20 is rotated around the axis CL1 by the actuator 10.

The actuator 10 is rotated in accordance with an operation of a shift lever or shift switch disposed on the driver's seat (shift operation). Examples of the shift operation include operations to switch to the D (drive) range, R (reverse) range, N (neutral) range, or P (parking) range. The shift operation is electrically detected by a sensor (not shown), and a controller (not shown) outputs control signals to the actuator 10 in accordance with the detection signal. Thus, the actuator 10 is driven and thus rotates the detent plate 20 to a predetermined position. The actuator 10 may be omitted and the shift operation may be mechanically transmitted to the detent plate 20 through a cable or the like. When a shift operation to a range other than the P range is detected, the controller outputs a parking release command to the actuator 10; when a shift operation to the P range is detected, the controller outputs a parking activation command to the actuator 10.

As shown in FIG. 3, the detent plate 20 is formed along a plane extending in the up-down direction and left-right direction. The base end of the parking rod 30 is coupled to the detent plate 20 so as to be rotatable with respect to the detent plate 20. The circumferential surface of the detent plate 20 is provided with multiple recesses 21. A detent spring 22 is disposed on the left side of the detent plate 20. As shown in FIG. 2, the detent spring 22 is fixed to the left wall of the motor cover 1 using a bolt. As shown in FIG. 3, a cylindrical end 22a of the detent spring 22 is fitted into one of the recesses 21 of the detent plate 20. Thus, the rotation position of the detent plate 20 is limited to one of multiple positions corresponding to the shift operations. For example, when a parking release command is outputted, the rotation position of the detent plate 20 is limited to a first position; when a parking activation command is outputted, the rotation position of the detent plate 20 is limited to a second position.

As shown in FIGS. 2 and 3, the parking rod 30 extends in the left-right direction from the inside of the motor cover 1 through the inside of the gear case 2 to the inside of the gear cover 3. More specifically, the parking rod 30 includes a rod portion 31 that serves as the base end of the parking rod 30 and extends in the front-rear direction, a rod portion 32 that extends so as to be bent rightward from the front end of the rod portion 31, a rod portion 33 that extends so as to be bent in a rear-right direction from the right end of the rod portion 32, and a rod portion 34 that extends so as to be bent rightward from the right end of the rod portion 33. A bent portion connecting the rod portion 31 and rod portion 32, a bent portion connecting the rod portion 32 and rod portion 33, and a bent portion connecting the rod portion 33 and rod portion 34 are hereafter referred to as a "first bent portion 36", a "second bent portion 37", and a "third bent portion 38", respectively.

The rod portion 31 penetrates the detent plate 20 in the front-rear direction. Since the rod portion 31 is subjected to swaging or the like, movement thereof in the front-rear direction, left-right direction, and up-down direction with respect to the detent plate 20 is restrained. Accordingly, a coupling portion 39 of the parking rod 30, which penetrates the detent plate 20, is able to rotate with respect to the detent plate 20 only in a plane perpendicular to the axis CL1. The rod portion 34, which is a portion closer to the top end (tip portion) of the parking rod 30 than the third bent portion 38 (a portion on the right side of the third bent portion 38), extends along an axis CL2 extending in the left-right direction, and the coupling portion 39 is located on an extension of the axis CL2.

The top end of the parking rod 30 (the rod portion 34) is provided with a conical parking cam 35. The parking cam 35 has a conical surface 35a around the axis CL2, and more left portions of the parking cam 35 have larger diameters. When the detent plate 20 is rotated to the first position in accordance with a parking release command, the parking cam 35 moves leftward along the axis CL2; when the detent plate 20 is rotated to the second position in accordance with a parking activation command, it moves rightward along the axis CL2.

Figure 4:
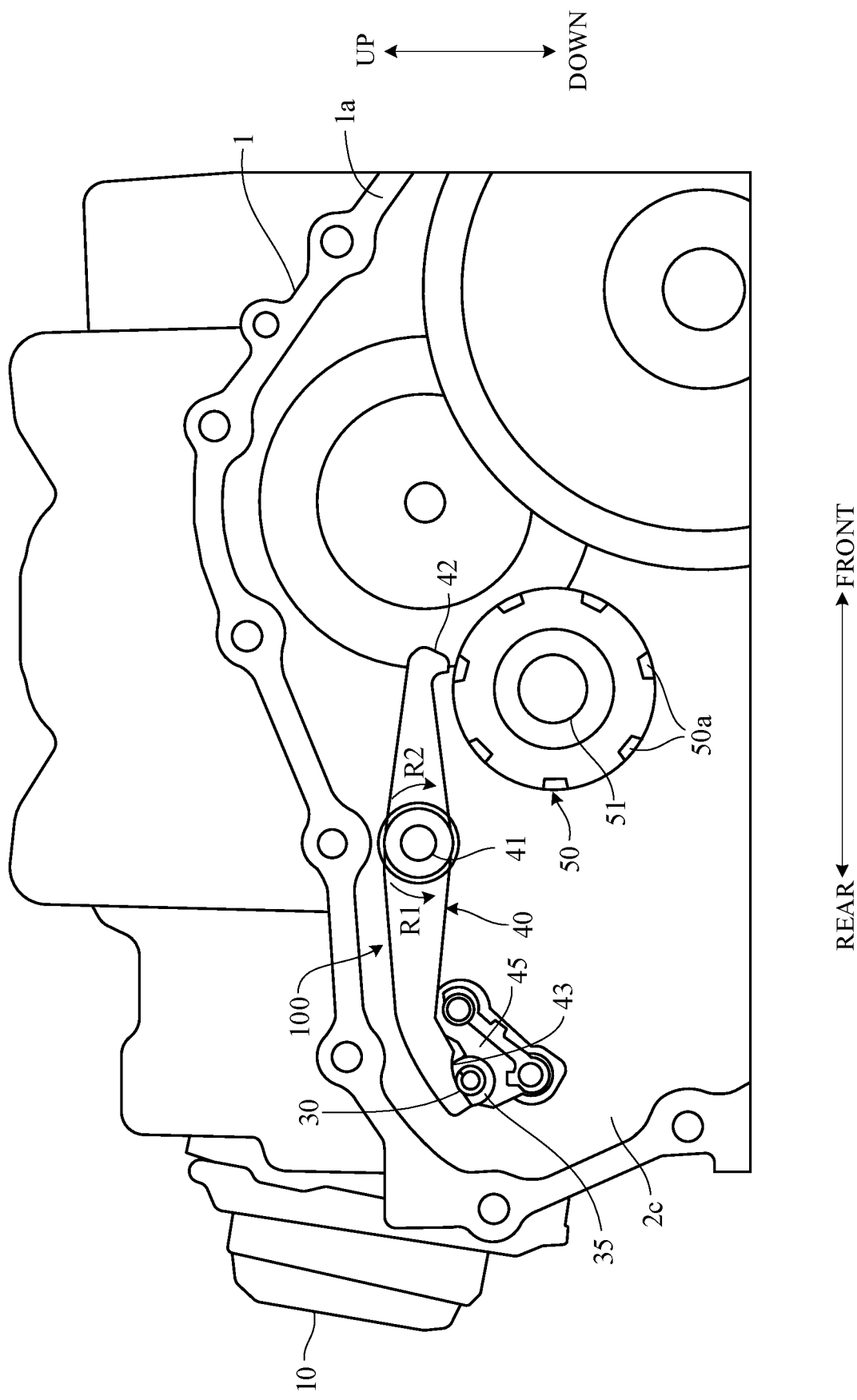
FIG. 4 is a front view of the vehicle parking apparatus incorporated in the vehicle drive apparatus of FIG. 1, seen from a top end side.

As shown in FIG. 3, the parking pawl 40 is in the shape of a lever extending in the front-rear direction, and the central portion thereof is rotatably supported by a rotary shaft 41 extending in the left-right direction. A spring 44 serving as a return spring is mounted on the rotary shaft 41, and the parking pawl 40 is always energized in the direction of R1 in FIG. 3 by the energizing force of the spring 44. As shown in FIG. 2, the rotary shaft 41 is supported by a partition 2c in the gear case 2. FIG. 4 is a right side view of the vehicle parking apparatus 100 incorporated in the vehicle drive apparatus 200 and shows the configuration of the vehicle parking apparatus 100 protruding rightward from the motor cover 1.

As shown in FIG. 4, the front end of the parking pawl 40 is provided with a nail-shaped engagement portion 42, and the rear end thereof is provided with a contact portion 43 that is in contact with the parking cam 35. The parking gear 50 integral with the rotary shaft 51 (FIG. 1) is disposed below the engagement portion 42. The rotary shaft 51 in FIG. 4 may be replaced with the rotary shaft 5c of the rotor 5b and the parking gear 50 integral with the rotary shaft 5c may be disposed in the same position as that in FIG. 4. As shown in FIGS. 3 and 4, the outer circumferential surface of the parking gear 50 is provided with circumferentially disposed multiple recesses 50a engageable by the engagement portion 42. A parking holder 45 is disposed below the contact portion 43 of the parking pawl 40. The parking holder 45 is fixed to the partition 2c of the gear case 2 using a bolt. With the position thereof being restricted by the parking holder 45, the parking cam 35 moves in the left-right direction in association with advance and retreat of the parking rod 30. That is, the parking cam 35 moves to the parking release position on the left side and the parking activation position on the right side.

FIG. 4 shows a state in which the parking cam 35 has moved to the parking release position. In this state, the parking pawl 40 is rotated in the direction of R1 by the energizing force of the spring 44 (FIG. 3). Thus, the engagement portion 42 moves away from the outer circumferential surface of the parking gear 50, and the parking apparatus 100 is released, that is, the parking lock is released (a parking-unlocked state). On the other hand, when the parking cam 35 moves to the parking activation position, the contact portion 43 of the parking pawl 40 is pushed up by the parking cam 35, resulting in rotation of the parking pawl 40 in the direction of R2. Thus, the engagement portion 42 is engaged with one of the recesses 50a of the parking gear 50, and the vehicle parking apparatus 100 is activated, that is, the parking lock is activated (a parking-locked state).

In the vehicle parking apparatus 100 according to the present embodiment thus configured, when the driver performs a shift operation for switching to a range other than the P range, the actuator 10 is activated and thus rotates the detent plate 20 to the first position. This rotation of the detent plate 20 is transmitted to the parking rod 30, resulting in movement of the parking cam 35 to the parking release position on the left side. Thus, the parking pawl 40 is rotated in the direction of R1 by the energizing force of the spring 44, and the engagement portion 42 moves away from the parking gear 50, placing the vehicle parking apparatus 100 in a parking-unlocked state.

On the other hand, when the driver performs a shift operation for switching to the P range, the actuator 10 is activated and thus rotates the detent plate 20 to the second position. Thus, the parking cam 35 moves to the parking activation position on the right side through the parking rod 30, and the parking pawl 40 swings in the direction of R2 against the energizing force of the spring 44. Thus, the vehicle parking apparatus 100 is placed in a parking-locked state and stops rotation of the drive wheels (drive shaft 8).

In the present embodiment, the parking rod 30 is disposed across the motor cover 1 and gear case 2. That is, the top end (right side) of the parking rod 30 is disposed in the gear case 2, and the base end (left side) thereof is disposed in the motor cover 1. Accordingly, when joining the motor cover 1 and gear case 2 together, the top end (right end) of the parking rod 30 needs to be inserted between the parking pawl 40 and parking holder 45. If the motor cover 1 and gear case 2 are joined together and then the parking pawl 40 and parking holder 45 are mounted, the parking rod 30 needs to be passed through the partition 2c of the gear case 2 and disposed in a predetermined position so as not to interfere with mounting of the parking pawl 40 and parking holder 45. However, the base end (left end) of the parking rod 30 is rotatably supported by the detent plate 20 through the coupling portion 39. For this reason, when assembling the vehicle parking apparatus 100 (when joining the motor cover 1 and gear case 2 together), the parking rod 30 may rotate, resulting in displacement of the position of the top end of the parking rod 30 from the normal position.

To resolve this problem, it is conceivable that a restriction member for restricting rotation of the parking rod 30 will be disposed. In this case, if the restriction member is, for example, in the shape of a cylinder, the long-length parking rod 30 needs to be passed through the restriction member, resulting in a reduction in the assemblability of the vehicle parking apparatus 100. Also, the restriction member is required only when assembling the vehicle parking apparatus 100 and therefore preferably has a minimum shape. In view of the foregoing, the vehicle parking apparatus 100 according to the present embodiment is configured as follows.

Figure 5:
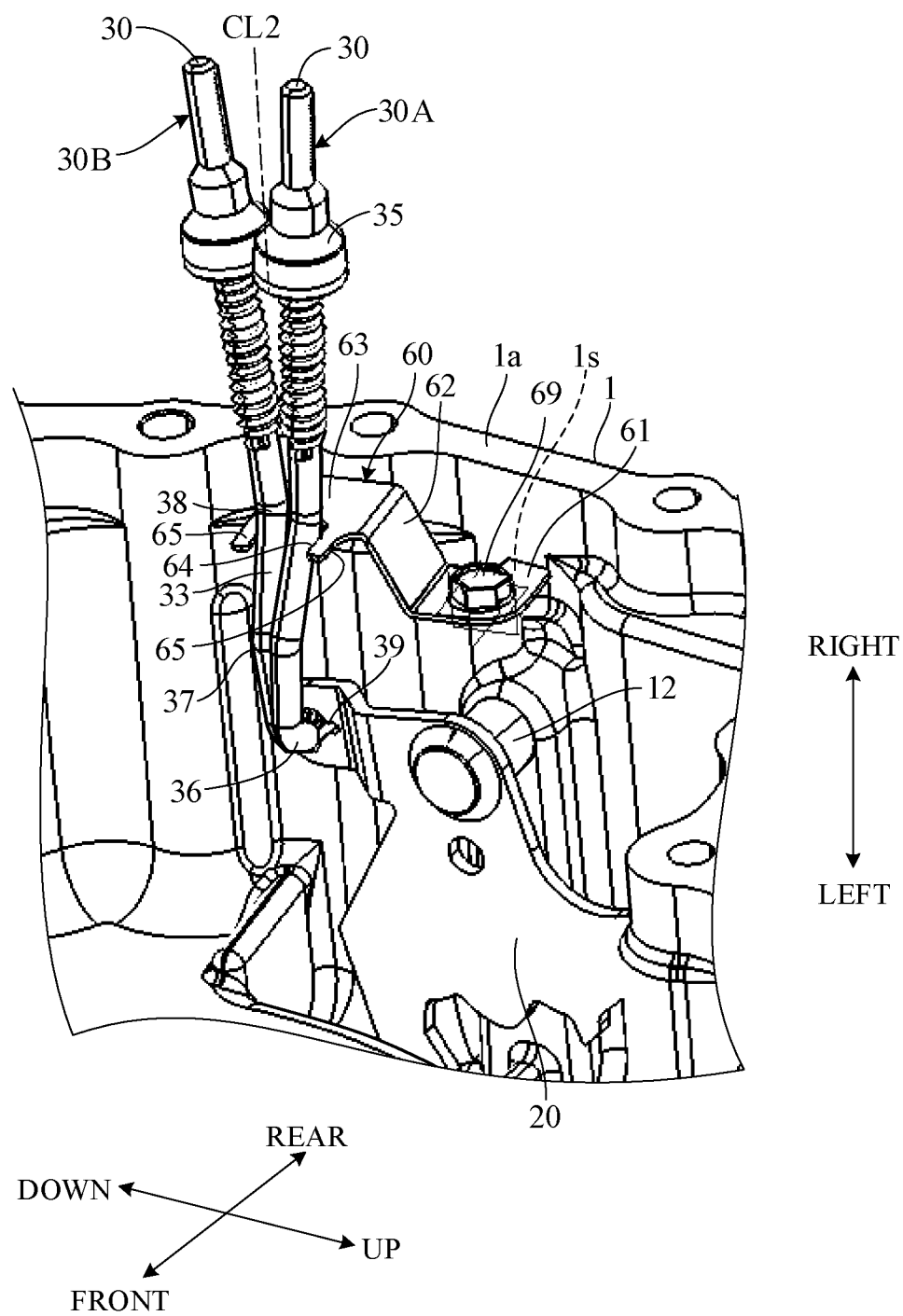
FIG. 5 is a perspective view showing a configuration of main component of the vehicle parking apparatus according to the embodiment of the invention.

FIG. 5 is a perspective view showing the configuration of main components of the vehicle parking apparatus 100 on the motor cover 1 side. As shown in FIG. 5, a stay 60 serving as a restriction member is mounted on the motor cover 1. FIG. 5 shows a state in which the parking rod 30 has been turned in one direction (upward) to the maximum extent (30A) and a state in which the parking rod 30 has been turned in another direction (downward) to the maximum extent (30B). In these states, the top end of the parking rod 30 is displaced upward or downward from the axis CL2 extending in the left-right direction.

As shown in FIGS. 3 and 5, the stay 60 includes a seat 61 and a support 63 that extend in planes perpendicular to the axis CL2 and a connector 62 that connects the lower end of the seat 61 and the upper end of the support 63. For example, the stay 60 is formed by bending a plate member. As shown in FIG. 5, the inner circumferential surface of the motor cover 1 is provided with a attachment surface is perpendicular to the axis CL2 on the right side of the rotary shaft 12 of the detent plate 20. The seat 61 is fixed to the attachment surface is using a bolt 69.

Figure 6:
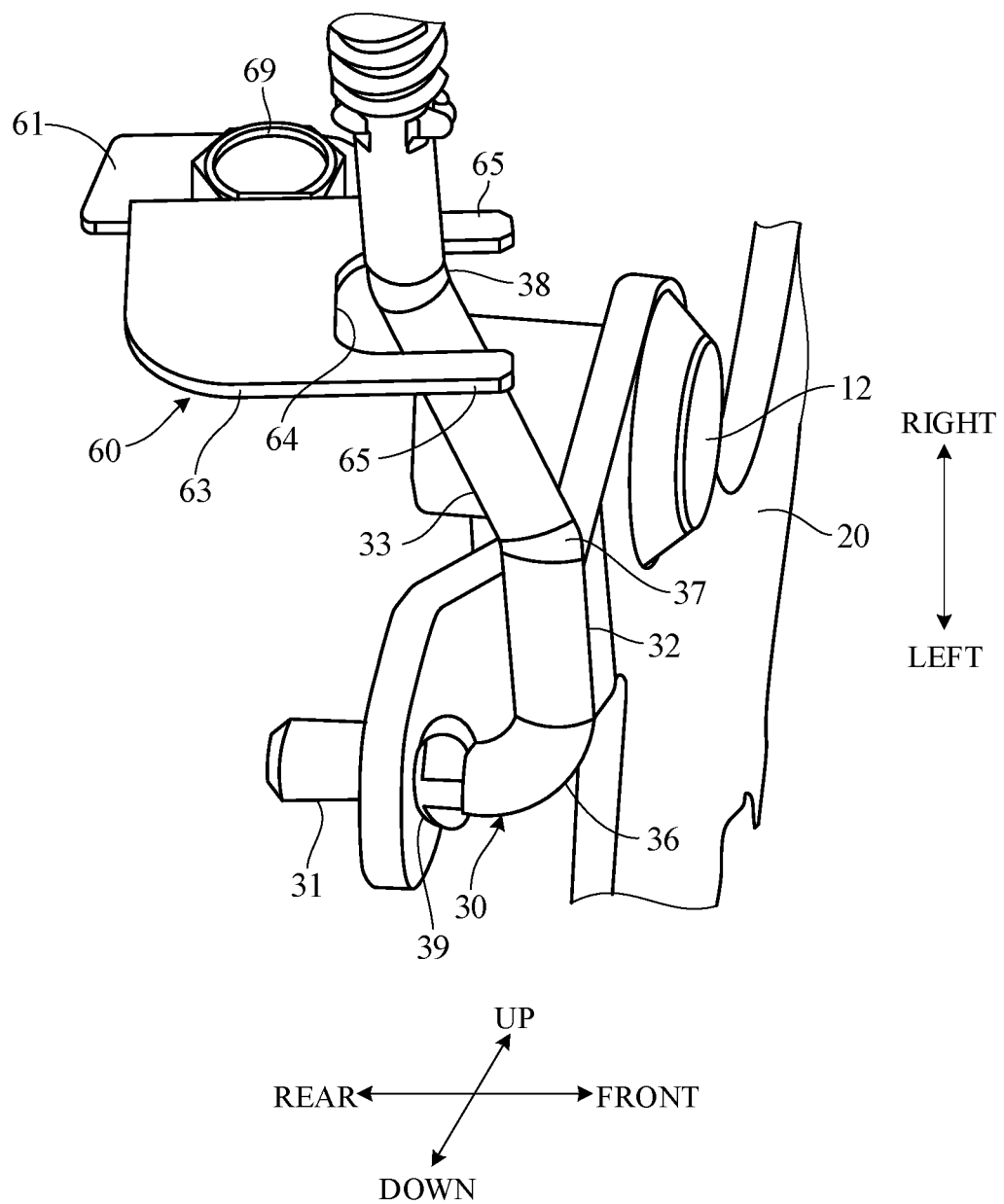
FIG. 6 is a perspective view showing a configuration of main component of the vehicle parking apparatus seen from a direction different from that in FIG. 5.

The connector 62 extends in a lower-right direction from the seat 61. Accordingly, the support 63 is located on the right side of and below the seat 61, and the axis CL2 passes through the central portion of the support 63. The support 63 is located on the left side of the right end surface (joined surface) 1a of the motor cover 1 so as not to protrude rightward from the motor cover 1. FIG. 6 is a perspective view showing the configuration of main components of the vehicle parking apparatus 100 seen from a direction different from that in FIG. 5. As shown in FIGS. 5 and 6, the support 63 is provided with an approximately rectangular notch 64 formed rearward from the front end surface of the support 63 and a pair of upper and lower restriction portions 65 disposed so as to sandwich the notch 64. That is, the restriction portions 65 are formed by forming the notch 64.

To assemble the vehicle parking apparatus 100, first, the stay 60 is attached on the attachment surface is of the motor cover 1 using the bolt 69. Then, the parking rod 30 is inserted into the notch 64 from the front of the stay 60 with the coupling portion 39 coupled to the detent plate 20. Then, the detent plate 20 is fixed to the rotary shaft 12. If the detent plate 20 and rotary shaft 12 are previously integrated, the rotary shaft 12 is coupled to the rotary shaft 11 of the actuator 10. In this case, the rod portion 33 between the second bent portion 37 and the third bent portion 38 of the parking rod 30 and, more specifically, the rod portion 33 adjacent to the third bent portion 38 is inserted into the notch 64.

As described above, in the present embodiment, the parking rod 30 is inserted into the notch 64 of the stay 60. Thus, after attaching the stay 60, the detent plate 20 having the parking rod 30 coupled thereto can be easily mounted on the rotary shaft 11 of the actuator 10 or the rotary shaft 12 having the rotary shaft 11 coupled thereto. More specifically, the detent plate 20 can be rotatably mounted to the motor cover 1 through the rotary shaft 12 while moving the detent plate 20 rearward. By mounting the detent plate 20, the turn range of the parking rod 30 is limited to a predetermined range in FIG. 5. Thus, during assembly of the motor cover 1 and gear case 2, the top end of the parking rod 30 can be easily inserted into a predetermined position between the parking pawl 40 and parking holder 45. If the motor cover 1 and gear case 2 are jointed together and then the parking pawl 40 and parking holder 45 are mounted, the top end of the parking rod 30 can be passed through the partition 2c (FIG. 2) of the gear case 2 and disposed in the predetermined position so as not to interfere with mounting of the parking pawl 40 and parking holder 45. The partition 2c is provided with an opening for passing the top end of the parking rod 30.

Figure 7:
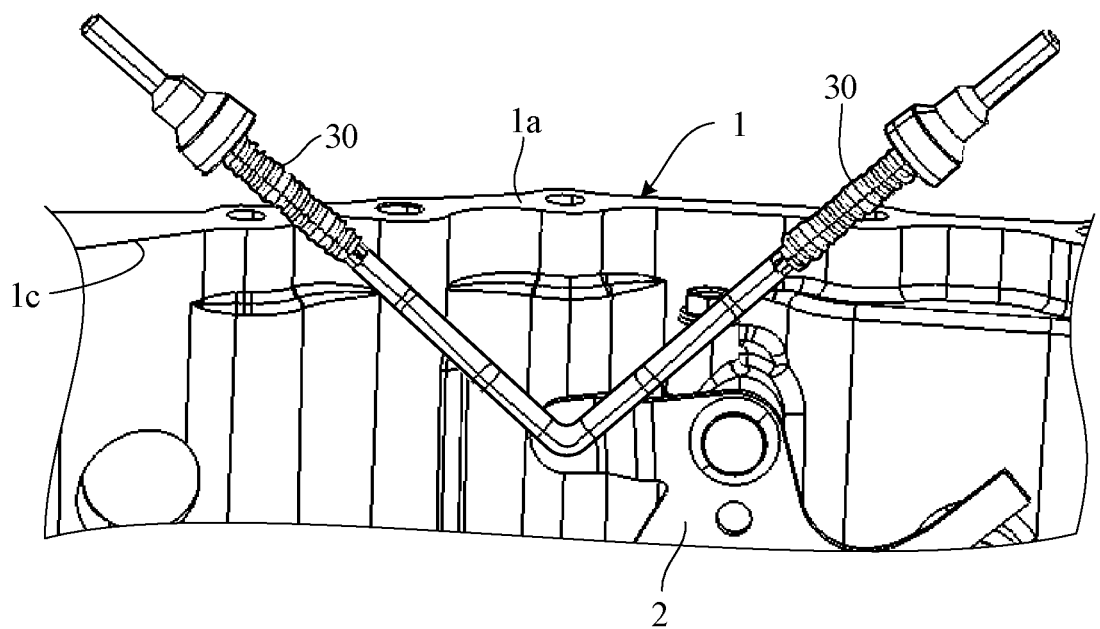
FIG. 7 is a view showing a comparative example of the vehicle parking apparatus according to the embodiment of the invention.

On the other hand, if the stay 60, such as that of the present embodiment, is not provided, the parking rod 30 can be turned over a wide range, as shown in FIG. 7. This makes it difficult to insert the top end of the parking rod 30 into the predetermined position during assembly of the motor cover 1 and gear case 2. Also, the parking rod 30 may contact the inner diameter-side edge 1c of the joined surface 1a of the motor cover 1, leading to pealing of the sealant previously applied to the joined surface 1a and thus degradation of the sealability.

Figure 8A:
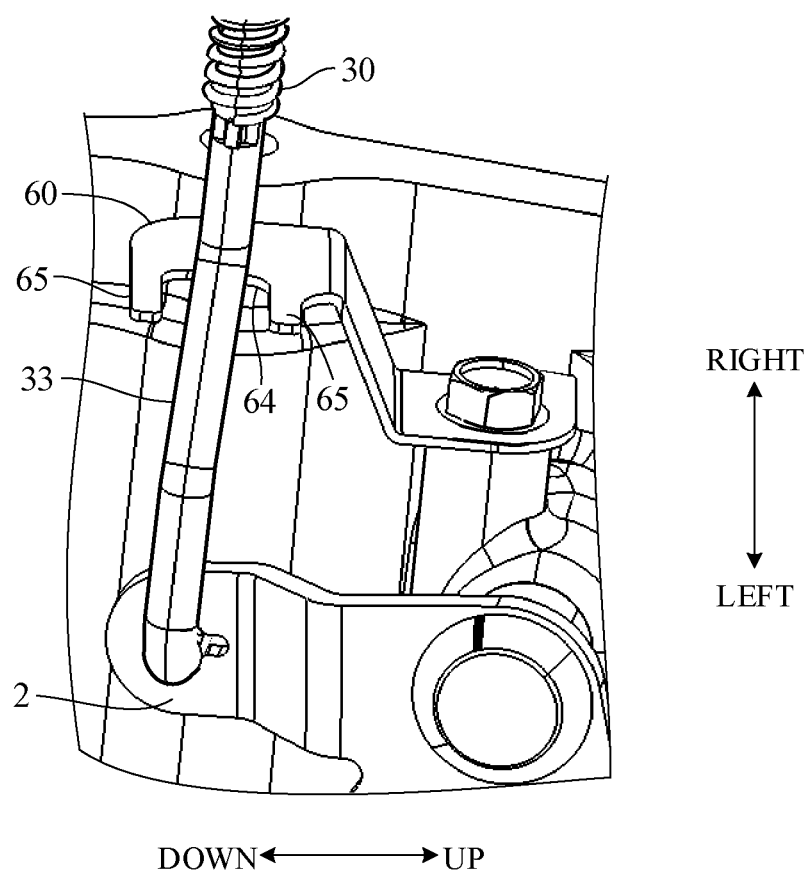
FIG. 8A is a perspective view showing an example of an operation of the vehicle parking apparatus according to the embodiment of the invention when a parking release command has been output.
Figure 8B:
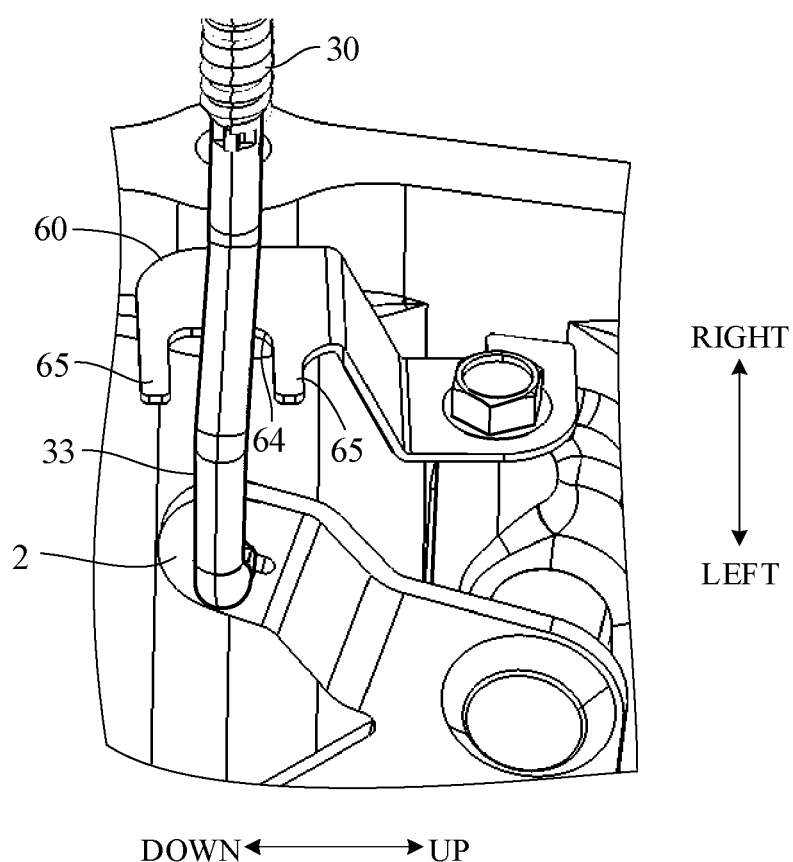
FIG. 8B is a perspective view showing an example of an operation of the vehicle parking apparatus according to the embodiment of the invention when a parking activation command has been output.
Figure 9A:
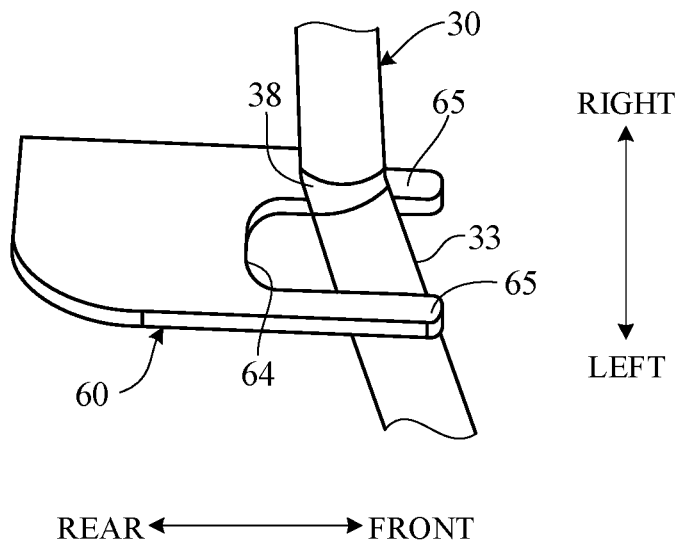
FIG. 9A is a perspective view corresponding to the operation of FIG. 8A, seen from a direction different from that in FIG. 8A.
Figure 9B:
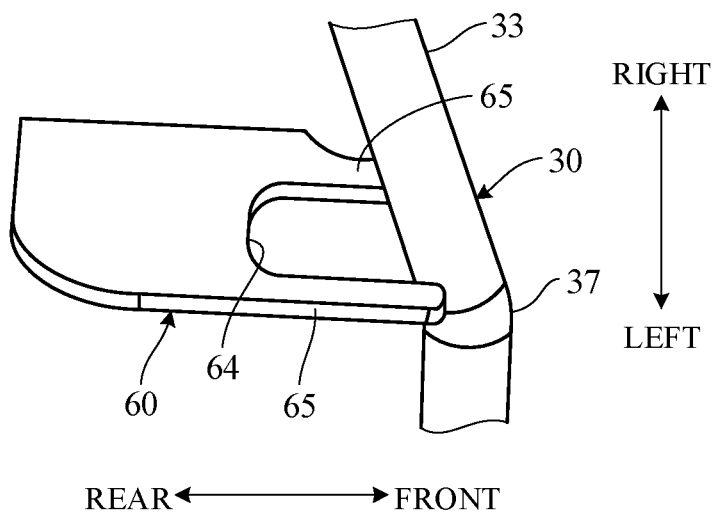
FIG. 9B is a perspective view corresponding to the operation of FIG. 8B, seen from a direction different from that in FIG. 8B.

FIGS. 8A, 8B, 9A, and 9B are perspective views showing the position relationship between the parking rod 30 and stay 60 in the assembled vehicle parking apparatus 100. Specifically, FIGS. 8A and 9A show an example of the operation when a parking release command has been outputted, and FIGS. 8B and 9B show an example of the operation when a parking activation command has been outputted. The state in FIGS. 8A and 9A corresponds to a state during assembly of the vehicle parking apparatus 100.

As shown in FIG. 8A, when a parking release command is outputted on the basis of a shift operation of the driver, the detent plate 20 is rotated to the first position and the parking rod 30 moves leftward. Thus, the parking pawl 40 is rotated in the direction of R1 in FIG. 4 by the energizing force of the spring 44, and the engagement portion 42 moves away from the parking gear 50, placing the vehicle parking apparatus 100 in a parking-unlocked state.

On the other hand, as shown in FIG. 8B, when a parking activation command is outputted on the basis of a shift operation of the driver, the detent plate 20 is rotated to the second position and the parking rod 30 moves rightward. Thus, the parking pawl 40 is pushed by the parking cam 35 and thus rotated in the direction of R2 in FIG. 4, and the engagement portion 42 is engaged with one of the recesses 50a of the parking gear 50, placing the vehicle parking apparatus 100 in a parking-locked state.

As shown in FIG. 8A, in the parking-unlocked state, the parking rod 30 is located in the central portion in the up-down direction of the notch 64 of the stay 60, and there are sufficient clearances between the parking rod 30 and the pair of upper and lower restriction portions 65. As shown in FIG. 8B, even in the parking-locked state, the parking rod 30 is located in the central portion in the up-down direction of the notch 64 of the stay 60, and there are sufficient clearances between the parking rod 30 and the pair of upper and lower restriction portions 65. This configuration allows the parking rod 30 to smoothly advance and retreat in the left-right direction in accordance with a shift operation without contacting the restriction portions 65.

Also, as shown in FIG. 9A, in the parking-unlocked state, the parking rod 30 (rod portion 33) is located in the central portion in the front-rear direction of the notch 64 of the stay 60. Accordingly, the parking rod 30 does not interfere with the stay 60, and there is a sufficient clearance between the parking rod 30 and the edge of the notch 64 behind the parking rod 30. On the other hand, as shown in FIG. 9B, in the parking-locked state, the parking rod 30 (rod portion 33) moves forward so as to move away from the stay 60, that is, moves toward the opening side of the notch 64. This configuration is able to reliably prevent the detent plate 20 and parking rod 30 from contacting each other during activation of the parking lock, allowing the parking rod 30 to smoothly advance and retreat in the left-right direction.

The present embodiment can achieve advantages and effects such as the following:

(1) The vehicle parking apparatus 100 is disposed across the motor cover 1 and gear case 2 joined together through the joined surfaces 1a and 2a (FIG. 2). That is, one end in the left-right direction thereof is disposed in the motor cover 1, and the other end is disposed in the gear case 2. The vehicle parking apparatus 100 includes: the detent plate 20 that is rotatably supported at the motor cover 1 and rotated in accordance with a parking activation command based on a shift operation for switching to the P range and a parking release command based on a shift operation for switching to a range other than the P range; the parking rod 30 that extends from the motor cover 1 to the gear case 2 and includes the base end pivotally supported at the detent plate 20 so that the parking rod 30 advances and retreats by rotation of the detent plate 20; the parking pawl 40 that is swingably supported at the gear case 2, is in contact with the parking cam 35 on the top end of the parking rod 30, and is engaged with or disengaged from the parking gear 50 in accordance with advance or retreat of the parking rod 30; and the notch 64 that is fixed to the motor cover 1 and into which the parking rod 30 can be inserted (FIGS. 2 and 3).

This configuration allows for easily inserting the long-length parking rod 30 into the notch 64 of the stay 60. For this reason, there is no limit to the length of the parking rod 30 during assembling the vehicle parking apparatus, resulting in an increase in the design flexibility of the vehicle parking apparatus 100. For example, if an approximately cylindrical rod guide is provided, it is difficult to insert the long-length parking rod 30 into the rod guide, and the parking rod 30 needs to be shortened. On the other hand, in the present embodiment, the parking rod 30 does not need to be shortened. The turn range of the parking rod 30 inserted into the notch 64 is limited by the restriction portions 65 on both sides of the notch 64. This configuration allows for accurately disposing the top end of the parking rod 30 in the predetermined position adjacent to the parking pawl 40 when joining the motor cover 1 and gear case 2 together. The stay 60 serving as a restriction member is configured by a plate member including the notch 64 and restriction portions 65. This configuration allows for downsizing the restriction member and thus minimizing a reduction in space efficiency caused by the disposition of the restriction member.

(2) The notch 64 is formed in the stay 60 so as to extend from the front end of the stay 60 in the rear direction, that is, in a direction along the axis CL1 along which the detent plate 20 is mounted to the motor cover 1. That is, the notch 64 is formed in parallel with or approximately in parallel with the mounting direction of the detent plate 20. This configuration allows for inserting the parking rod 30 into the notch 64 while mounting the detent plate 20 to the motor cover 1, leading to an improvement in the assemblability of the vehicle parking apparatus 100.

(3) The detent plate 20 extends in a direction perpendicular to the axis CL1, in other words, in a direction perpendicular to the mounting direction of the detent plate 20 (FIG. 3). The base end (rod portion 31) of the parking rod 30 penetrates the detent plate 20 and the coupling portion 39 is pivotally supported at the detent plate 20 (FIG. 6). This configuration allows the parking rod 30 to favorably advance and retreat along the axis CL2 by rotation of the detent plate 20 while suppressing turn of the parking rod 30.

(4) The parking rod 30 also includes the first bent portion 36 that is bent from the base end rightward, that is, toward the parking pawl 40 and the second bent portion 37 that is located in a position closer to the top end than the first bent portion 36 and is bent toward the stay 60 (FIG. 2). Thus, when a parking activation command is outputted and the parking rod 30 moves rightward, the rod portion 33 moves in a direction in which it moves away from the detent plate 20 (in the front direction) (FIG. 9B). This configuration is able to reliably prevent the stay 60 and parking rod 30 from contacting each other, allowing the parking rod 30 to smoothly advance and retreat.

(5) The parking rod 30 also includes the third bent portion 38 that is located in a position closer to the top end than the second bent portion 37 and is bent rightward, that is, toward the parking pawl 40 (FIG. 2). The portion supported by the detent plate 20, of the parking rod 30, that is, the coupling portion 39 is disposed on the axis CL2 connecting the top end (parking cam 35) of the parking rod 30 and the third bent portion 38 (FIG. 3). Accordingly, a line connecting the support point (coupling portion 39) and action point (parking cam 35) of the parking rod 30 is aligned with the axis CL2. This configuration allows the parking rod 30 to efficiently push the parking pawl 40 in a direction perpendicular to the axis CL2 while suppressing the bending force acting on the parking rod 30.

(6) The stay 60 includes the seat 61 that is attached on the motor cover 1, the support 63 that is disposed in a position closer to the joined surface 1a of the motor cover 1 than the seat 61 and includes the notch 64 and restriction portions 65, and the connector 62 that connects the seat 61 and support 63 (FIG. 5). This configuration allows for increasing the distance between the coupling portion 39 of the parking rod 30 and the restriction portions 65 of the stay 60, as well as allows for setting large clearances between the parking rod 30 and restriction portions 65. As a result, this configuration is able to reliably prevent the parking rod 30 and restriction portions 65 from contacting each other during activation and release of the vehicle parking apparatus 100. This configuration also allows for a reduction in the swing angle of the parking rod 30 and thus an improvement in assemblability.

(7) The motor cover 1 and gear case 2 are jointed together through the sealant previously applied to the joined surfaces 1a and 2a. In such a configuration, the parking rod 30 and the edges of the joined surfaces 1a and 2a must be prevented from contacting each other even in the middle of assembling the vehicle parking apparatus 100. The present embodiment is able to prevent such contact.

The above-mentioned embodiment can be modified into various forms. Hereafter, modifications will be described. While, in the above embodiment, the vehicle parking apparatus 100 is disposed across the motor cover 1 serving as a first case and the gear case 2 serving as a second case, the first case and second case need not be configured as described above. While, in the above embodiment, the base end of the parking rod 30 is pivotally supported at the detent plate 20 serving as a rotation member, the rotation member may be configured otherwise as long as it is rotated in accordance with a parking activation command and a parking release command. A part of the rotation member may be provided with a plate portion having an approximately flat surface at which the base end of the parking rod is rotatably supported.

While, in the above embodiment, the parking rod 30 includes the first bent portion 36 that is bent from the base end toward the parking pawl 40, the second bent portion 37 that is located in a position closer to the top end than the first bent portion 36 and is bent toward the stay 60, and the third bent portion 38 that is located in a position closer to the top end than the second bent portion 37 and is bent toward the parking pawl 40, a parking rod may be configured otherwise. Note that the parking rod is preferably configured to, when pushing the parking pawl, move in a direction in which it moves away from the stay, as described above (FIG. 9B). While, in the above embodiment, the stay 60 is formed by connecting the seat 61 (a stay attachment portion) and the support 63 (a rod support portion) through the connector 62 (a connecting portion), a stay may be formed otherwise. While, in the above embodiment, the notch 64 is formed in the support 63 of the stay 60 and thus the restriction portions 65 are formed on both sides of the notch 64, a restriction portion for restricting the amount of turn of the parking rod 30 may be formed without forming a notch.

In the above embodiment, the vehicle parking apparatus 100 is applied to the vehicle drive apparatus 200 including the electric motor 5 as a drive source of the vehicle. However, a vehicle parking apparatus according to the present invention can be also applied to an automatic transmission mounted on the vehicle in the same manner as the above embodiment. Therefore, the vehicle parking apparatus can be also applied to an apparatus or device other than the above apparatus.

The aforesaid embodiment can be combined as desired with one or more of the above modifications. The modifications can also be combined with one another.

According to the present invention, there is no limit to a length of a parking rod to be considered during assembling a vehicle parking apparatus, resulting in an increase in a design flexibility of the vehicle parking apparatus.

Above, while the present invention has been described with reference to the preferred embodiments thereof, it will be understood, by those skilled in the art, that various changes and modifications may be made thereto without departing from the scope of the appended claims.

What is claimed is:

1. A vehicle parking apparatus, displaced across a first case and a second case joined together through a joined surface of the first case and a joined surface of the second case, the vehicle parking apparatus comprising:
- a rotation member supported rotatably at the first case to rotate in accordance with a parking activation command and a parking release command;
- a parking rod extended from the first case to the second case and including a base portion supported rotatably at the rotation member to move to a first direction and a second direction opposite to the first direction by a rotation of the rotation member;
- a parking pole supported swingably at the second case and brought into contact with a top portion of the parking rod to engage with and disengage from a parking gear in accordance with a movement of the parking rod in the first direction and the second direction; and
- a stay formed in a plate shape, fixed to the first case and including a notch into which the parking rod is inserted, wherein
- the notch is formed substantially in parallel with an attachment direction of the rotation member to the first case, and
- the stay includes:
  - a stay attachment portion attached on the first case;
  - a rod support portion located on a side of the joined surface relative to the stay attachment portion, and including the notch; and
  - a connecting portion configured to connect the stay attachment portion and the rod support portion.

2. The vehicle parking apparatus according to claim 1, wherein
the rotation member includes a plate portion extending in a direction substantially perpendicular to the attachment direction, and
the base portion of the parking rod is passed through the plate portion so as to be rotatably supported at the plate portion.

3. The vehicle parking apparatus according to claim 2, wherein
the parking rod further includes a first bent portion bent from the base portion toward the parking pole and a second bent portion bent between a top portion and the first bent portion toward the stay.

4. The vehicle parking apparatus according to claim 3, wherein
the parking rod further includes a third bent portion bent between the top portion and the second bent portion toward the parking pole, and
a support portion of the parking rod supported by the rotation member is located on a straight line joining the top portion of the parking rod and the third bent portion.

5. The vehicle parking apparatus according to claim 1, wherein
the rod support portion is located between the stay attachment portion and the joined surface.

6. The vehicle parking apparatus according to claim 1, wherein
the first case includes an attachment surface perpendicular to a direction along which the parking rod is extended, and
the stay attachment portion of the stay is attached on the attachment surface.

7. The vehicle parking apparatus according to claim 5, wherein
the first case includes an attachment surface perpendicular to a direction along which the parking rod is extended, and
the stay attachment portion of the stay is attached on the attachment surface.

8. The vehicle parking apparatus according to claim 1, wherein
the stay includes the notch and a restriction portion configured to restrict a rotational amount of the parking rod.

9. The vehicle parking apparatus according to claim 1, wherein
the first case and the second case are joined together through a sealant previously applied to the joined surfaces.

* * * * *